United States Patent [19]
Lyden

[11] Patent Number: 6,082,462
[45] Date of Patent: Jul. 4, 2000

[54] HORSESHOE IMPARTING NATURAL CONFORMANCE AND FUNCTION PROVIDING ADJUSTABLE SHAPE AND ATTENUATION OF SHOCK AND VIBRATION

[76] Inventor: Robert M. Lyden, 18261 SW. Fallatin Loop, Aloha, Oreg. 97007

[21] Appl. No.: 09/045,442

[22] Filed: Mar. 20, 1998

[51] Int. Cl.[7] .................................. A01L 1/00; A01L 1/02
[52] U.S. Cl. ................................................ 168/24; 168/4
[58] Field of Search .................................. 168/4, 12, 17, 168/23, 24, DIG. 1

[56] References Cited

U.S. PATENT DOCUMENTS

| | | | |
|---|---|---|---|
| 170,911 | 12/1875 | Smith | 168/24 |
| D. 268,445 | 3/1983 | Charlson | D30/35 |
| D. 270,958 | 10/1983 | Rigney | D30/35 |
| D. 306,922 | 3/1990 | Anderson | D30/148 |
| 374,727 | 12/1887 | Bingham | 168/7 |
| 382,131 | 5/1888 | Bingham et al. | 168/7 |
| D. 385,006 | 10/1997 | Sims | D21/221 |
| 427,976 | 5/1890 | Curtin | 168/7 |
| 526,050 | 9/1894 | Poupard | 168/4 |
| 681,370 | 8/1901 | Padden | 168/7 |
| 841,031 | 1/1907 | Martins | 168/12 |
| 985,249 | 2/1911 | Butschko | 168/4 |
| 1,861,695 | 6/1932 | Harsem | 168/12 |
| 3,494,422 | 2/1970 | Clark | 168/4 |
| 3,603,402 | 9/1971 | McDonnell | 168/4 |
| 3,628,608 | 12/1971 | Sherman | 168/4 |
| 3,630,289 | 12/1971 | Norberg | 168/28 |
| 3,747,684 | 7/1973 | Wallen | 168/28 |
| 3,841,408 | 10/1974 | Bucalo | 168/7 |
| 3,861,472 | 1/1975 | McConnon | 168/15 |
| 3,907,036 | 9/1975 | Capone | 168/26 |
| 3,941,380 | 3/1976 | Lacoste | 273/72 A |
| 3,952,807 | 4/1976 | Cattaneo | 168/28 |
| 4,122,900 | 10/1978 | Barr et al. | 168/12 |
| 4,206,811 | 6/1980 | Dallmer | 168/4 |
| 4,207,947 | 6/1980 | Cope et al. | 168/29 |
| 4,253,526 | 3/1981 | Alletrux | 168/4 |
| 4,265,314 | 5/1981 | Tovim | 168/4 |
| 4,286,666 | 9/1981 | Nakanishi | 168/4 |
| 4,333,532 | 6/1982 | Mennick | 168/24 |
| 4,346,762 | 8/1982 | Tovim | 168/4 |
| 4,420,046 | 12/1983 | Chplin | 168/14 |
| 4,480,698 | 11/1984 | Reeves | 168/4 |

(List continued on next page.)

FOREIGN PATENT DOCUMENTS

| | | | |
|---|---|---|---|
| 1058510 | 6/1952 | France | 168/4 |
| 9645 | 4/1880 | Germany | 168/4 |
| WO 94/13164 | 6/1994 | WIPO . | |

OTHER PUBLICATIONS

Arthur H. Benade, "Fundamentals of Musical Acoustics", 1990.
Harry F. Olson, "Music, Physics and Engineering", 1967.
Luwex Ad (2 pages).

*Primary Examiner*—Michael J. Carone
*Assistant Examiner*—Son T. Nguyen
*Attorney, Agent, or Firm*—Westman, Champlin & Kelly, P.A.

[57] ABSTRACT

A horseshoe of the present invention taken in combination with a horse's foot imparts a conformance similar to that found in healthy and active horses living in a natural environment. Accordingly, a horseshoe can include an anterior and side concavities. Further, a horseshoe can include segments made of a relatively inflexible material which can be articulated relative to one another about at least one articulation point. The articulation point(s) substantially consist of a relatively flexible material which permits the foot to widen when loaded and enables the horseshoe to be easily fitted.

A preferred horseshoe can also include a resilient pad for attenuating shock and vibration. The inclusion of a resilient pad is accomplished without substantially elevating the foot, thus enhancing stability and reducing the potential for injury.

19 Claims, 8 Drawing Sheets

U.S. PATENT DOCUMENTS

| | | | |
|---|---|---|---|
| 4,513,824 | 4/1985 | Ford | 168/4 |
| 4,557,334 | 12/1985 | Cattaneo | 168/12 |
| 4,565,250 | 1/1986 | Vasko | 168/12 |
| 4,573,538 | 3/1986 | Figueras | 168/14 |
| 4,580,637 | 4/1986 | King | 168/7 |
| 4,585,068 | 4/1986 | Jungersen | 168/11 |
| 4,605,071 | 8/1986 | McKibben | 168/12 |
| 4,616,709 | 10/1986 | Lee | 168/113 |
| 4,645,008 | 2/1987 | Benning | 168/11 |
| 4,721,165 | 1/1988 | Ovnicek | 168/24 |
| 4,765,412 | 8/1988 | Colonel et al. | 168/15 |
| 4,775,011 | 10/1988 | McCuan | 168/12 |
| 4,823,883 | 4/1989 | Colonel et al. | 168/12 |
| 4,844,172 | 7/1989 | Lee | 168/13 |
| 4,878,541 | 11/1989 | Pedersen | 168/4 |
| 4,889,188 | 12/1989 | Anderson | 168/13 |
| 4,899,824 | 2/1990 | Techer et al. | 168/14 |
| 4,972,909 | 11/1990 | Rose | 168/4 |
| 4,993,494 | 2/1991 | Tuunanen | 168/4 |
| 4,998,586 | 3/1991 | Fox et al. | 168/12 |
| 5,002,132 | 3/1991 | Fox et al. | 168/4 |
| 5,076,366 | 12/1991 | Liskey | 168/12 |
| 5,105,891 | 4/1992 | Noffsinger | 168/13 |
| 5,121,798 | 6/1992 | Lindh | 168/12 |
| 5,137,092 | 8/1992 | Tuunanen | 168/4 |
| 5,137,093 | 8/1992 | Stephens | 168/12 |
| 5,165,481 | 11/1992 | Duckett | 168/4 |
| 5,180,017 | 1/1993 | Alagna | 168/12 |
| 5,186,259 | 2/1993 | Teichman | 168/24 |
| 5,205,362 | 4/1993 | Noffsinger | 168/13 |
| 5,213,163 | 5/1993 | Schaffer | 168/4 |
| 5,253,715 | 10/1993 | Ovnicek | 168/14 |
| 5,287,931 | 2/1994 | Eriksson | 168/24 |
| 5,289,878 | 3/1994 | Landi et al. | 168/14 |
| 5,303,777 | 4/1994 | Zook | 168/12 |
| 5,320,184 | 6/1994 | Noffsinger | 168/13 |
| 5,343,957 | 9/1994 | Chapman | 168/11 |
| 5,348,098 | 9/1994 | Di Giulio | 168/12 |
| 5,353,878 | 10/1994 | Lee | 168/13 |
| 5,362,046 | 11/1994 | Sims | 273/73 |
| 5,368,104 | 11/1994 | Duckett | 168/4 |
| 5,439,062 | 8/1995 | Ovnicek | 168/14 |
| 5,509,484 | 4/1996 | Landi et al. | 168/14 |
| 5,538,083 | 7/1996 | Vindriis | 168/6 |
| 5,566,765 | 10/1996 | Ovnicek | 168/4 |

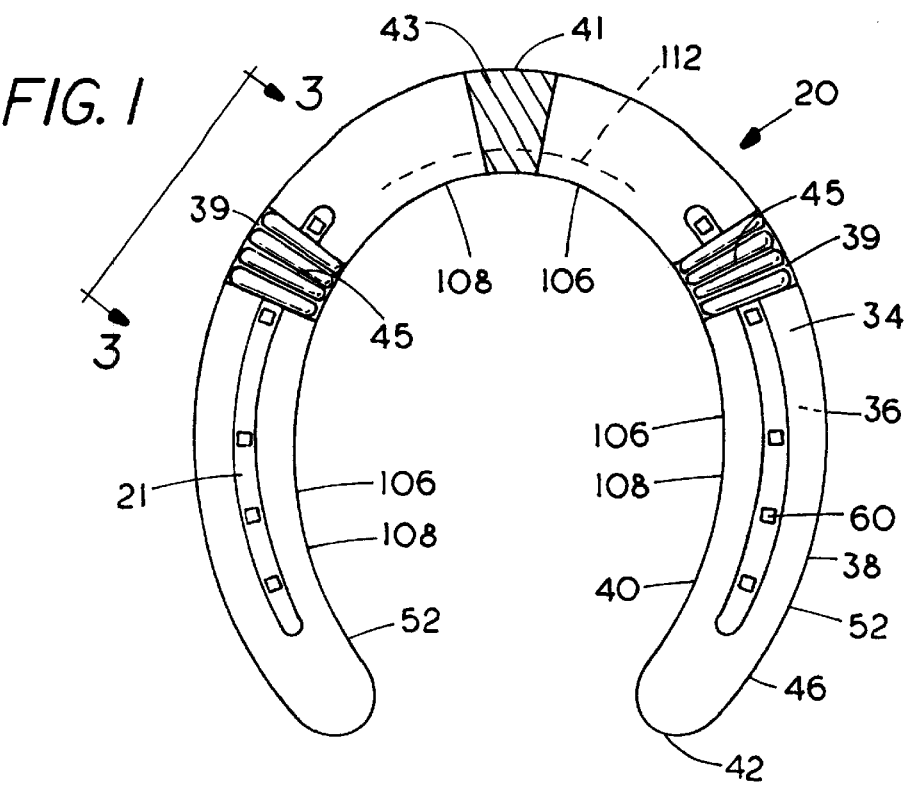
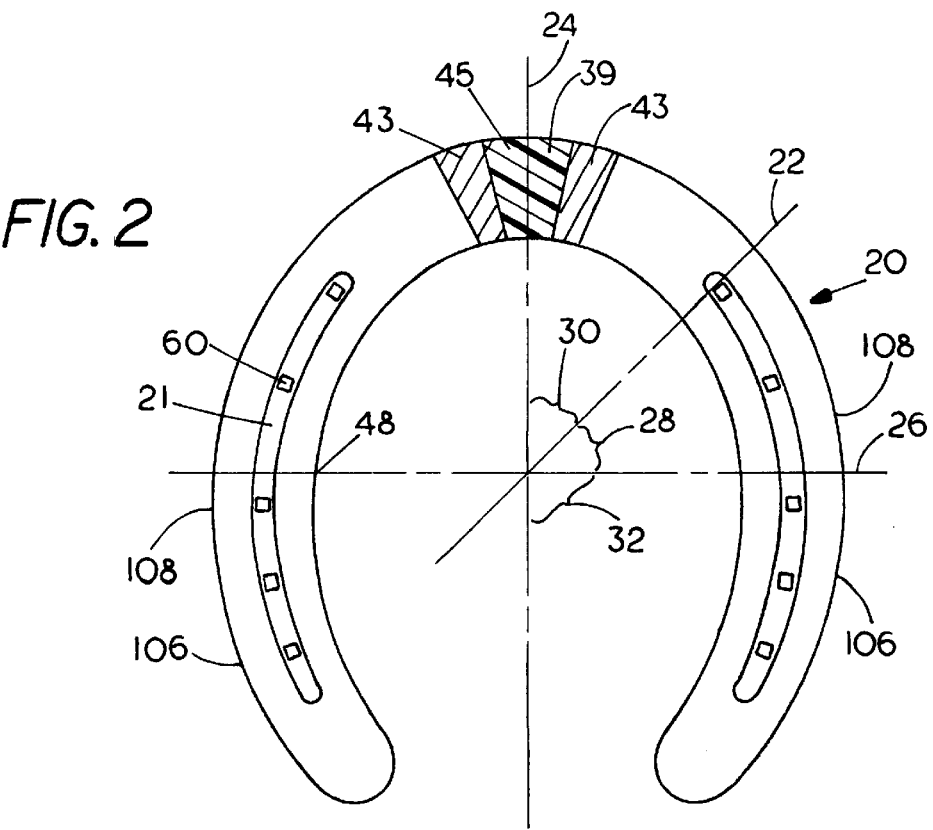

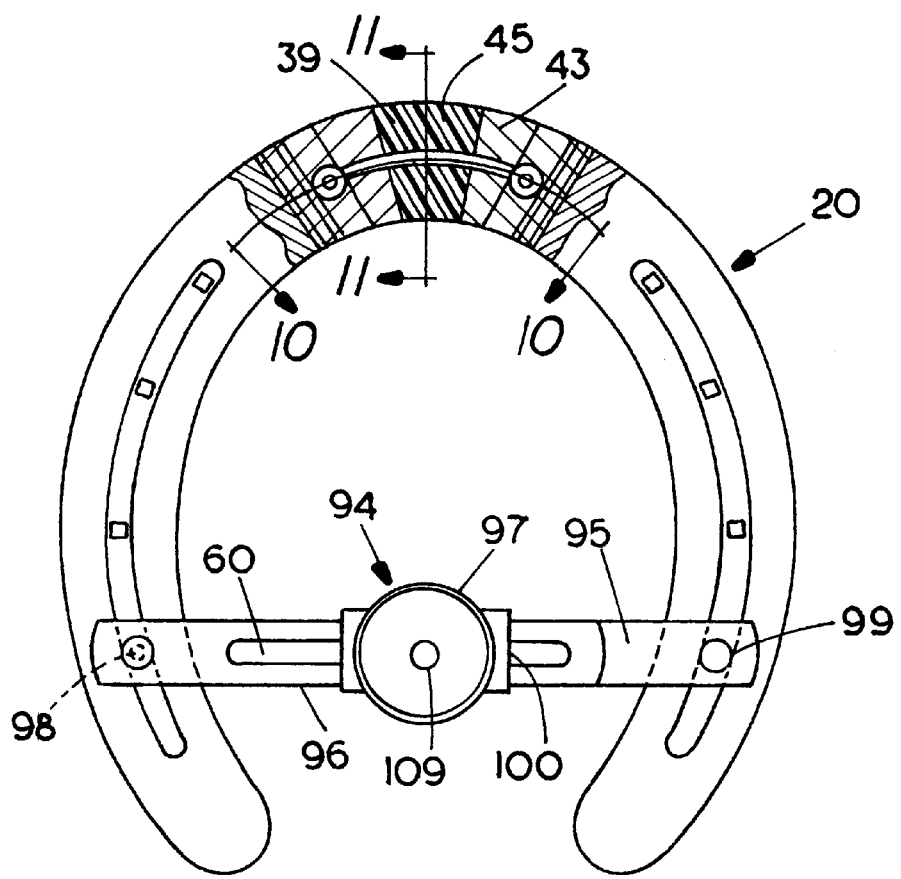
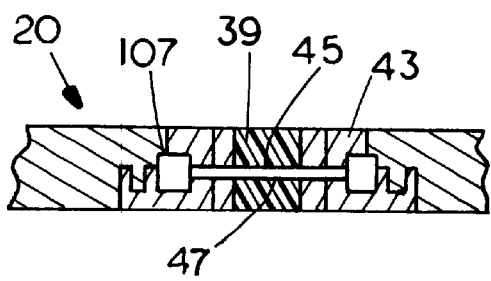
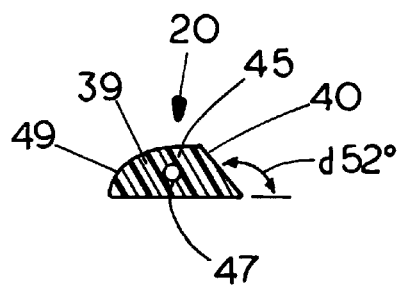

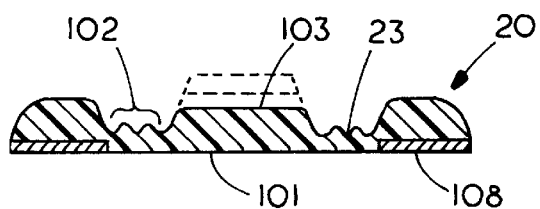
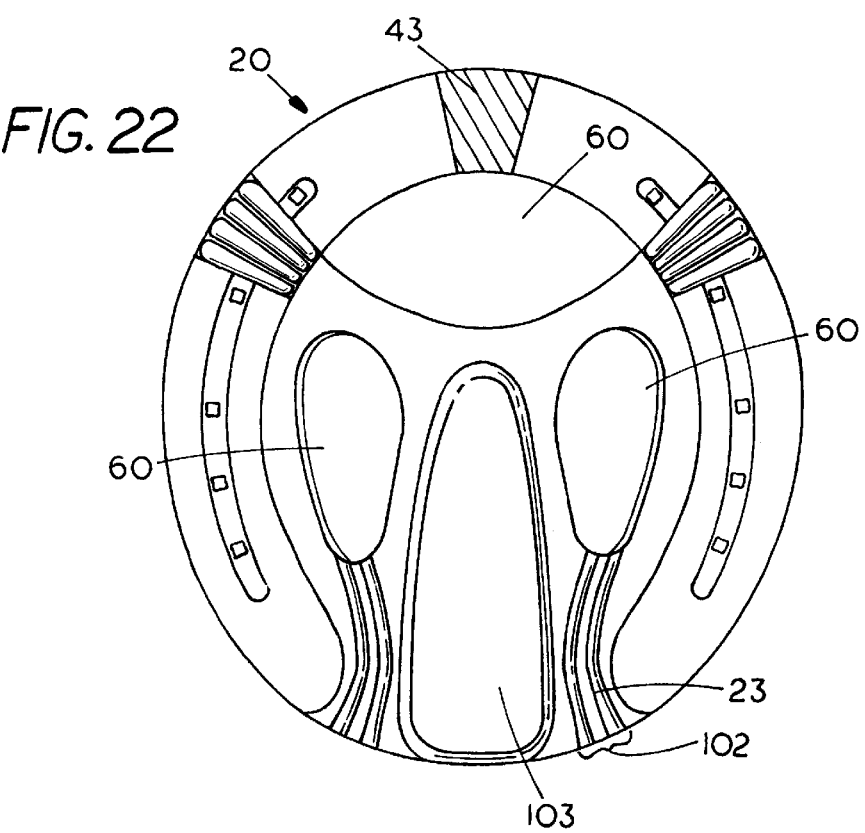
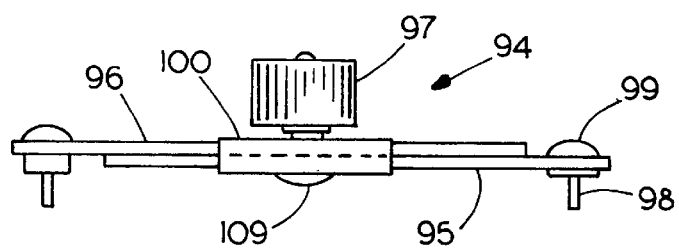

HORSESHOE IMPARTING NATURAL CONFORMANCE AND FUNCTION PROVIDING ADJUSTABLE SHAPE AND ATTENUATION OF SHOCK AND VIBRATION

BACKGROUND OF THE INVENTION

This invention relates to a horseshoe which taken in combination with a horse's foot imparts a conformance resembling that commonly found in healthy active unshod horses living in a natural environment.

Further, the invention relates to a horseshoe which has the ability to flex about at least one articulation point to assume a desired shape and width. In addition, the invention relates to a horseshoe which includes a resilient pad for attenuating shock and vibration associated with impact events.

Horseshoes have been used for centuries in order to afford protection to the horse's foot and to enhance performance. Most horseshoes in use today are made of metal such as steel, aluminum alloys, and rarely, stainless steel or titanium. Aluminum alloys are most commonly used today in racing as such are characterized by relatively low weight and expense. Horses engaged in training or racing are commonly reshod every two to three weeks. This is done in consideration for the wear incurred by the horseshoes, but also by the desire to maintain healthy geometry with respect to the configuration of the foot and so facilitate optimal biomechanics, or way of going.

Alternatively, horseshoes are also made from various plastic, rubber, or composite materials. However, plastic, rubber, or composite horseshoes have not substantially replaced more conventional metal horseshoes in the marketplace. This is largely due to the existence of outstanding questions or problems regarding the durability, weight, expense, biomechanical soundness, or possible adverse health effects associated with such horseshoes. In particular, the use of some plastic materials and/or the adhesives used to bond a plastic horseshoe to a horse's foot have sometimes led to illness, as these materials can release chemicals which are capable of migrating or diffusing into the horse's foot.

Non-metallic materials such as plastic or rubber are sometimes used in combination with a metal horseshoe and such hybrid products are generally referred to in the industry as bonded horseshoes. Examples of bonded horseshoes include, e.g., U.S. Pat. No. 4,889,188 granted to William H. Anderson on Dec. 26, 1989, U.S. Pat. No. 5,320,184 granted to Alfred A. Noffsinger on Jul. 14, 1994, and U.S. Pat. No. 5,348,098 granted to Benedetto Di Giulio on Sep. 20, 1994. Plastic and rubber materials have been chemically and/or mechanically bonded to metal shoes to create various configurations, e.g., these materials have been used between upper and lower metal layers of a horseshoe, between the horseshoe and the hoof, on the ground engaging portion of a horseshoe, and to completely encapsulate a metal horseshoe.

A wide variety of pads, boots, and padding materials have also been used in order to protect horses from point loads, and the shock and vibration associated with impact events. For example, pads including honeycomb shaped cells containing a gas are recited in U.S. Pat. No. 5,509,484 granted on Apr. 23, 1996, and U.S. Pat. No. 5,289,878 granted on Mar. 1, 1994, to Curtis L. Landi and Susan L. Wilson. This technology has been commercialized and is known and sold under the HONEYCOMB PAD trademark. Further, a horse can sometimes become injured by incorrect shoeing, disease, or trauma during exercise. Pads which teach the provision of support for the center of the foot and frog in order to relieve the loads being placed upon various tendons and the coffin bone or P1 include, e.g., U.S. Pat. No. 4,878,541 granted to Palle Pedersen on Nov. 7, 1986, and U.S. Pat. No. 4,775,011 granted to David B. McCuan on Oct. 4, 1988. Therapeutic horseshoes for supporting the frog, tendons and coffin bone also include, e.g., U.S. Pat. 5,439,062 granted Aug. 8, 1995, and U.S. Pat. No. 5,253,715 granted Oct. 19, 1993, to Eugene D. Ovnicek.

Like the majority of conventional plastic or rubber bonded shoes, most pads or boots serve to elevate the horse's foot above the ground support surface over and above the height of a conventional horseshoes. Conventional horseshoes commonly range in height approximately between 0.18–0.375 inches. Higher foot elevations can be associated with increased instability, faulty biomechanics and greater risk of injury. Further, increases in shoe weight possibly coupled with higher foot elevations and resulting biomechanical changes can also lead to injury by taxing the horse's joints, muscles, tendons and ligaments. This is especially true with respect to athletic horses which commonly run at speeds exceeding 30 miles per hour, as the terminal velocity of the distal portions of the horse's limbs can then be moving at several times that speed.

The surfaces on which horses train and perform also vary widely. Horses frequently train and compete on grass, sand, cinder, crushed stone, and sometimes on packed surfaces which nearly approach the hardness of asphalt or cement. The hardness of the training or racing surfaces can greatly increase the effective rate of loading, thus the shock and vibration, e.g., the peak g forces which the horse will experience. Such will necessarily influence the nature of the waveform and the primary frequencies of shock and vibration transmitted to a horse's anatomy. These factors can directly affect a horse's efficiency, athletic performance and the amount of trauma that will be experienced.

Accordingly, it can be readily understood that the potential for injury is large whenever horses train or race on hard surfaces. In this regard, knowledgeable human distance runners and coaches learned many years ago that the artificial track is a good place to perform required speed work or to compete. However, the track is an unsuitable environment for conducting the bulk of the training program lest athletes quickly become injured and mentally stale. Likewise, horses are best trained by placing them into open paddocks and training them on forgiving yet not unstable natural surfaces. Clearly, no single factor can so greatly affect the level of stress being placed upon a horse, as can the training or racing surface and overall training program.

The teachings of the present invention can be better appreciated if some of the biomechanical events associated with the phenomenon under discussion are understood. While the characteristic biomechanics or way of going of horses can vary, e.g., as between Standardbreds and Thoroughbreds, what normally happens as a horse's foot and hoof impacts the ground is that the back of the foot touches first, then the foot flattens and slides anteriorly skating across the surface. In particular, this is true of a horse's rear foot, then the rear portion of the foot is loaded and deflection takes place. This will generally cause the foot to rotate backwards at the heel. The foot will then rotate forwards and recover to a relatively neutral position. Subsequently, the foot rapidly rotates forwardly and about a rocker point located between the geometric center of the foot and a short distance behind the anteriormost area of the toe as the foot breaks over and toe-off takes place, thus ending the ground support phase and beginning the flight phase.

It is known that the foot of an active unshod horse living in a natural environment will wear such that the front and back of the hoof become gently rounded. In fact, horseshoes which are initially substantially rectangular in cross-section will wear in these areas and eventually enable the combination of a horse's foot and horseshoe to assume a somewhat similar shape. Unfortunately, many conventional horseshoes are so constructed as to require replacement by the time this more natural configuration is attained. It is also known that the hoof of an active unshod horse living in a natural environment will assume a slightly arcuate concave shape in the toe area between the medial and lateral sides, as when viewed from the front, but also along both sides of the hoof between the toe and heel. This configuration permits the hoof to better slide or plane over the ground support surface during the braking phase as impact takes place, thereby reducing the effective rate of loading and the shock and vibration experienced. Further, this configuration also permits the hoof to better grab the surface during the later propulsive phase, and to break over and make a faster transition during toe-off, thus enhancing stride frequency and exhibited speed. The ability of the horse's hoof to slide somewhat can also enhance stability relative to a situation in which a horse's foot would suddenly catch or grab the ground support surface, as can happen with the use of horseshoes having rectangular configurations which possibly further include toe grabs, raised traction members or cleats. Of course, the presence of extremely loose or slippery ground can neutralize the possible adverse effects of such traction devices, and in fact, such may provide better performance and safety in such circumstances.

However, the use of horseshoes having relatively high elevations, relatively rectangular shape in the area of the toe, or raised traction members such as toe grabs can inhibit the ability of the horse's foot to break over, that is, to rapidly toe off in the latter part of the propulsive portion of the ground support phase. This tendency is more pronounced when such devices are used on relatively hard ground support surfaces. Besides resulting in a reduction of the horse's stride frequency and exhibited speed, such can also result in excessive strain being placed upon tendons and result in serious injury, perhaps crippling a horse. U.S. Pat. No. 5,566,765 granted on Oct. 22, 1996, and U.S. Pat. No. 4,721,165 granted on Jan. 26, 1988 to Eugene D. Ovnicek, which have been commercialized, known, and sold under the WORLD RACING PLATE trademark, U.S. Pat. No. 5,368,104 granted on Nov. 29, 1994, and U.S. Pat. No. 5,165,481 granted on Nov. 24, 1992 to Dave Duckett, and U.S. Pat. No. 4,333,532 granted to Paul E. Mennick on Jun. 8, 1982, discuss the known condition of a healthy horse's foot in the natural state and teach various devices and means thought to be conducive to the maintenance of a horse's health and to provide optimal performance. All of the above recited patents are hereby incorporated by reference herein.

Furthermore, it is known that in the unshod natural state, a horse's foot and hoof will flex and slightly widen when it is loaded. Discussion of this known phenomenon is found, e.g., in U.S. Pat. No. 4,513,824 granted to Donald F. Ford on Apr. 30, 1985. The use of relatively rigid metal or aluminum horseshoe substantially prevents this natural movement and so tends to reduce both the effective size, and the shock and vibration absorbing capability of a horse's foot. A steel horseshoe is known to be more flexible in this regard than an aluminum or titanium horseshoe. It is believed that the occurrence of hoof cracks is sometimes caused by the flexing and widening action of the foot and hoof working against the nails associated with a substantially inflexible horseshoe. An object of the present invention is to provide a horseshoe that will facilitate the natural widening flexing movement of the horse's foot and hoof while still providing the protection and wear afforded by conventional horseshoes.

It is known that when shod, the downward movement of the center of a horse's foot can sometimes impact the inner upper edge of a conventional horseshoe, as such may not perfectly fit the shape of the horse's foot or otherwise accommodate for this movement. U.S. Pat. No. 5,186,259 to Stephen T. Teichman granted Feb. 16, 1993, hereby incorporated by reference herein, as well as the aforementioned patents to Dave Duckett teach the inclusion of a recessed area in the inner top surface of a horseshoe for accommodating this possible movement. The ability of the horseshoe of the present invention to flex and widen as the horse's foot is loaded can provide further accommodation for this phenomenon.

One of the challenges encountered when attempting to reduce the rate of loading, and attenuate the shock and vibration experienced by a horse is posed by the fact that a horse is a rather large animal, e.g., commonly weighing between 800–1400 pounds, and when running at speeds between 30–40 miles per hour, a load exceeding 15,000 pounds can be placed upon a horse's leg. Accordingly, approximately 2600 pounds per square inch can be placed upon a typical horseshoe having roughly 6.5 square inches of working surface. When running on a hard race track, the entire duration of the impact event can be as short as 1.5 milliseconds, and over 350 peak g's can then be experienced, as illustrated in U.S. Pat. No. 4,565,250 granted to Kent Vasko on Jan. 21, 1986, hereby incorporated by reference herein. By way of comparison, humans commonly experience something in the range of only 10–14 peak g's of acceleration when running on asphalt in quality athletic footwear. By way of comparative anatomy, the most distal bone proximate the horse's hoof, i.e., the coffin bone or P1, corresponds to the most distal phalange in the tip of the finger or toe of the human hand or foot. All things considered, it is perhaps surprising that equine injuries are not more common.

The magnitude of the loads commonly placed upon the horseshoe, as discussed above, tends to prohibit the use of soft plastic, rubber, or other elastomeric and resilient materials, as used in athletic footwear made for human use which are commonly in the range between 35–55 Shore Asker C durometer. The loads placed upon the horse's foot and hoof are such that most pads or bonded shoes in the prior art have utilized materials having a Shore A hardness in excess of 75, and generally in the range between 85–95 durometer, e.g., see the pad taught in U.S. Pat. No. 3,747, 684 granted to Bjorn Valter Wallen on Jul. 24, 1973. Otherwise, the stiffness of the plastic or rubber material proves insufficient to prevent substantial deformation which could result in an unnatural hoof angle, bottoming out of the material, or an inefficient spring rate, and thereby possibly induce injury. As previously discussed, pads which greatly elevate the foot can also induce instability and injury. Further, the indiscriminate use of large quantities of relatively heavy plastic or rubber material having a high durometer is not an efficient means of reducing the rate of loading, and attenuating shock and vibration. Moreover, the use of a large surface area of elastomeric material such as rubber adjacent the hoof, and in particular, when such is sandwiched between the horse's hoof and a metal horseshoe, as shown, e.g., in U.S. Pat. No. 3,861,472 granted to Edward McConnon on Jan. 21, 1975, commonly results in the metal shoe squirming about and working against the heads of nails until one or more nails actually become severed and the horseshoe works loose. This is a relatively common experience with athletic horses engaged in training and competition and can result in the crippling of a horse. Accordingly, it can be advantageous to avoid the introduction of a large surface area of relatively soft plastic or rubber material adjacent the hoof.

The present invention serves to reduce the rate of loading, and attenuate the shock and vibration which is experienced by a horse when running. It can be advantageous to provide a resilient pad which serves as a spring and dampener to reduce the normal rate of loading and unloading by extending the duration of these events over time. Further, the spring rate of the resilient pad and amount of deflection provided thereby can be engineered as to provide tuned and efficient mechanical response characteristics relative to the known biomechanics of a horse having a given approximate body weight, running style and velocity. Unlike the majority of prior art horseshoes including a pad, the present invention teaches introducing a pad in such a manner as to not further elevate the foot substantially beyond the height of a typical conventional horseshoe. Further, the present invention teaches the use of a pad which is substantially disposed in the rear portion of a horseshoe. The loading experienced in the rear portion of a horseshoe is sudden and primarily associated with impact during the braking phase, and loading of the foot during stance, whereas the loading which is experienced in the anterior portion of the horseshoe is normally less sudden and largely associated with the propulsive phase. It can then be readily understood, that the introduction of a resilient pad in the anterior portion of a horseshoe which would deflect when loaded could result in reduced efficiency and speed without providing substantial benefit as concerns shock and vibration reduction.

Yet another aspect of vibration reduction and isolation concerns the duration to which a sentient being such as a human or a horse is subjected to vibration due to an impact event. When a metal bell is struck the bell will resonate and continue to ring for an extended time while the vibration energy is gradually dampened out. The same thing is true with regards to a metal horseshoe. When horses run on hard tracks the ringing of their horseshoes can be heard at some distance. This is unfortunately frequently the case with Standardbreds which tend to strike harder with their front legs as a consequence of their running style and often run upon firm track surfaces.

The dampening capability of the horse's hoof and foot in combination with the dampening provided by the running surface will silence the ringing of the metal horseshoe over time, but due to the multiplicity of impacts, perhaps not until after the horse has finished its run. When a small bell is rung, one can place one's hand upon it and silence it. Likewise when a note on a piano is played, the vibrating metal string can be dampened by the felts incorporated into the piano's mechanism.

The use of felt pads between metal horseshoes and the horse's hoof tends to accomplish the same task.

An example of a felt pad is taught in U.S. Pat. No. 5,137,093 granted to Dennis N. Stephens on Aug. 11, 1992. But again, there can be certain problems with the use of such pads. Felt pads can absorb and retain water thereby add to weight carried at the hoof, and can also serve as a haven for minute plant and insect life. Again, most pads serve to raise the height of the horses foot above the ground and thereby inherently decrease stability.

The present invention can rapidly attenuate the vibration of a horseshoe caused by impact with a ground support surface. In particular, the present invention can accomplish this without substantially elevating or adding weight to a horseshoe. Unfortunately, horses can not talk and tell us what they are feeling when we hear their metal shoes ringing as they impact upon a hard track surface. But many of us probably have experience in using aluminum baseball and softball bats, and know that when it rings, it stings. Associated with that stinging is pain, reduced sensation and proprioception, and even reduced neuromuscular effort as the body seeks to protect itself from a perceived source of trauma or injury. This phenomenon can then result in injury and decreased performance.

A technology pioneered by Steven C. Sims, as taught in U.S. Pat. No. 5,362,046, granted Nov. 4, 1994, hereby incorporated by reference herein, has been commercialized by Wilson Sporting Goods, Inc. into the SLEDGEHAMMER® INTUNE® tennis rackets, by Hillerich and Bradsby Company, Inc. in the LOUISVILLE SLUGGER® SIMS STINGSTOP® trademark aluminum baseball and softball bats, as well as the POWERBUILT® SIMS SHOCK RELIEF® golf club line. These products substantially eliminate the ringing and stinging associated with impact events.

However, the present invention teaches another method of vibration decay time modification during and after an impact event with respect to horseshoes. Changing the effective length and geometry of a rigid member, and in particular, changing the effective length and shape of a horseshoe with the use of relatively inflexible or rigid segments which are substantially interrupted or isolated by areas of relatively flexible and resilient dampening material can dramatically affect the characteristic mode(s) of vibration and nodal points of a horseshoe. The negative nodal point is a point at which a substantial portion of the vibration energy in the horseshoe will pass as the horseshoe is excited by the energy associated with an impact event. Discussion of modes of vibration and negative nodal points can be found in Arthur H. Benade, *Fundamentals of Musical Acoustics*, 2nd edition, New York: Dover Publications, 1990, Harry F. Olson, *Music, Physics and Engineering*, 2nd edition, New York: Dover Publications, 1967, and U.S. Pat. No. 3,941,380 granted to Francois Rene Lacoste on Mar. 2, 1976, this patent hereby being incorporated by reference herein.

In a preferred horseshoe of the present invention, the characteristic mode(s) of vibration and nodal points are so altered, and the dampening material is introduced in such a manner as to substantially prevent the horseshoe from going into resonance and ringing during and following an impact event.

An object of the present invention is to provide a horseshoe which does not substantially elevate the horse's foot above the height of conventional metal horseshoes, thus minimizing the possible introduction of instability.

An object of the present invention is to minimize the amount of plastic or rubber material which is placed in communication with the horse's hoof in order to reduce the amount of expose of the hoof to possible migration of substances contained in such materials which could adversely affect the health of the horse's foot. Further, an alternate object of the present invention is to use plastic and rubber materials which are known to be relatively harmless and not subject to such degradation.

An object of the present invention is to avoid placing a large surface area of resilient plastic or rubber material sandwiched between a metal horseshoe or like component and a horse's hoof, as such is known to result in squirming of the horseshoe, damage to the nails, and perhaps catastrophic loss of a horseshoe during training or racing.

An object of the present invention is to avoid the addition of weight to a horseshoe, as such can cause greater trauma to joints and connective tissue, and alterations in a horse's biomechanics or way of going which can be inefficient and result in interference.

An object of the present invention is to reduce the effective magnitude of the loads, and shock and vibration, and also the vibration decay time associated with the use of horseshoes.

An object of the present invention is to provide something resembling the conformance and performance which the active horse's foot acquires in the natural unshod condition to a foot which is shod with a horseshoe.

An object of the present invention is to facilitate the natural flexing and widening of the horse's foot when weight bearing.

An object of the present invention is to provide a therapeutic horseshoe/pad combination for possible use with injured horses.

An object of the present invention is to provide a horseshoe having at least one articulation point so that the horseshoe can be flexed in order to assume a desired shape and width and thereby be easily fitted to a horse's foot.

An object of the present invention is to provide a simple and effective shape and width adjusting device for use with a horseshoe of the present invention.

SUMMARY OF THE INVENTION

The preferred horseshoe can include a plurality of segments, each segment having a bottom side that is substantially orientated upon a single transverse plane. The segments are preferably made of a relatively inflexible material. However, the segments are preferably capable of articulation relative to one another along the transverse plane about at least one articulation point which is preferably substantially made of a relatively flexible material.

A preferred horseshoe can be made using two segments which are capable of being articulated relative to one another along the transverse plane about an articulation point located proximate the anterior of the toe. Alternately, a preferred horseshoe can include a first segment, a second segment, and a third segment being capable of articulation relative to one another along the transverse plane about a first articulation point and a second articulation point. The first articulation point is preferably located between the first segment and the second segment, and the second articulation point is preferably located between the first segment and the third segment. Again, the articulation points are substantially made of a relatively flexible material.

The preferred horseshoe includes mechanical means for joining the segments and substantially preventing elongation and lengthening therebetween. The mechanical means used to achieve this purpose can substantially consist of wire. Alternately, the mechanical means can include a first segment having a first arm and a second segment having a second arm, the first and second arms each having an opening, and a rivet passing through these respective openings joining the segments. Alternately, the mechanical means can include a first segment having a male member, and a second segment having a female member, the male and female members being placed in functional relation to join the segments.

The segments are preferably made of a relatively inflexible material such as metal, e.g., steel or aluminum. Alternately, the segments can be made of a relatively inflexible thermoplastic material, e.g., polyphenylsulfate. The articulation points are preferably made of a relatively flexible material, e.g., a natural or synthetic rubber, or relatively flexible thermoplastic material, e.g., a polyurethane or thermoplastic rubber. The preferred horseshoe can also include at least one wear resistant insert and/or toe grab.

The preferred horseshoe can include a tapered toe configuration. The preferred horseshoe can include an anterior concavity. The preferred horseshoe can include a side concavity. The preferred horseshoe can include a resilient pad. The preferred horseshoe can include a resilient pad substantially covering the frog. Furthermore, the preferred horseshoe can include these features in partial or complete combination.

The preferred horseshoe can be applied with the use of a shape and width adjusting device including at least two moveable arms which include means for mechanically engaging the horseshoe which can be selectively locked into position.

BRIEF DESCRIPTION OF THE DRAWINGS

FIG. 1 is a top plan view of a preferred embodiment of a horseshoe showing two articulation points including a relatively flexible resilient material, and also indicating a cross-section taken at approximately half of the height of the horseshoe in the transverse plane, along line 3—3.

FIG. 2 is a top perspective view of an alternate preferred embodiment of a horseshoe showing one anterior articulation point including a relatively flexible resilient material, superior to inferior, anterior to posterior, and medial to lateral or transverse axes, and the sagittal, frontal and transverse planes.

FIG. 9 is a top plan view of the horseshoe shown in FIG. 2 with parts broken away in the anterior portion showing the presence of a wire, wear resistant metal inserts, and relatively flexible material, but also a shape and width adjusting device in position.

FIG. 10 is a cross-sectional view along the superior to inferior axis substantially along the frontal plane of the horseshoe shown in FIG. 9, along line 10—10.

FIG. 11 is a cross-sectional view along the superior to inferior axis substantially along the sagittal plane of the horseshoe shown in FIG. 9, along line 11—11.

FIG. 20 is a cross-sectional view along the frontal plane of the horseshoe shown in FIG. 19, along line 20—20.

FIG. 21 is a cross-sectional view along the sagittal plane of the horseshoe shown in FIG. 19, along line 21—21.

FIG. 22 is a top plan view of a horseshoe similar to that shown in FIG. 19, but having openings therein.

FIG. 23 is a side view of the shape and width adjustment device for use with a horseshoe, as shown in FIG. 9.

DETAILED DESCRIPTION OF THE PREFERRED EMBODIMENTS

Figure 3:
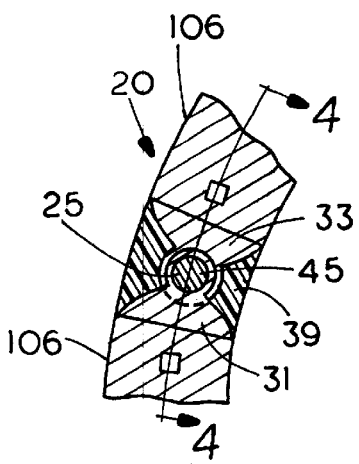
FIG. 3 is a top plan view of a portion of the horseshoe shown in FIG. 1 with parts broken away near the cross-section taken along line 3—3, showing the use of a rivet to join two arms present on segments of the horseshoe.

The present invention teaches a novel configuration for a preferred horseshoe which taken in combination with the foot imitates the known configuration which healthy, active, unshod horses acquire when living in a natural environment. Further, the present invention teaches a preferred horseshoe that includes articulation points which permit natural flexing and widening of the foot and horseshoe when loaded, but also enable the horseshoe to be easily fitted to a foot having a given shape and width. In addition, the present invention teaches the use of a resilient pad in the rear portion of a preferred horseshoe for decreasing the effective rate of loading and attenuating shock and vibration associated with impact events. Moreover, the present invention teaches the use of full or partial pads in a preferred horseshoe for relieving injury.

The preferred horseshoe 20 is generally U-shaped and substantially made of a relatively inflexible material 108, e.g., a metal such as steel, stainless steel, aluminum, aluminum alloys, titanium, and the like. It can also be advantageous that a preferred horseshoe 20 include a hard wear resistant insert 43, such as steel, carbide steel, ceramic, and the like, in select locations. However, a preferred horseshoe 20 can also be made in whole or in part of plastic, rubber, or hybrid combinations of plastic and rubber, or other elastomers such as polyurethane, or composite materials. Composite materials can include fillers such as natural or synthetic fibers, textiles, carbon fibers, or glass fibers. The same types of fillers can also be used in horseshoes containing plastic or rubber materials. Other possibly suitable fillers include, e.g., carbon black, various talks, clays, organic or inorganic microspheres, metals, ceramic materials, and the like. It can be appreciated that some of the so-called plastic or rubber materials being used in prior art horseshoes are of such high durometer hardness and exhibit such high stiffness in bending or compression as to consist of a relatively inflexible material 108. Such can resist being flexed in any manner by human hands, and such are often not capable of significantly reducing the rate of loading, or attenuating the shock and vibration associated with impact events.

The preferred horseshoe 20 is configured so as to imitate in combination with the horse's foot the conformance attained by an active and healthy unshod horse's foot when living in a natural environment. Accordingly, the preferred horseshoe 20 includes a gradually tapered toe 49, an anterior concavity 63, and side concavities 88 on both the medial and lateral aspects of the horseshoe 20.

Further, the preferred horseshoe 20 can be formed in a plurality of segments 106 consisting of a relatively inflexible material 108. Segments 106 can be affixed in functional relation to one another through various mechanical means which substantially prevent elongation therebetween. However, segments 106 can otherwise be flexed about articulation point(s) 45 along one or more planes, and in particular, substantially along the transverse plane 32 prior to the preferred horseshoe being affixed to the foot with nails, or other means. This can enable the preferred horseshoe to be properly fitted to a horse without the need to heat or forge the horseshoe, and can save both the owner of the horse and the blacksmith time, effort and expense.

The preferred horseshoe 20 includes articulation point(s) 45 between adjoining segments 106 for flexing or articulating the horseshoe 20 into the desired shape and width. A relatively flexible material 39 such as plastic or rubber can join and encapsulate the area proximate the articulation points 45 creating an essentially unitary horseshoe 20. A resilient pad 92 can also be used with a preferred horseshoe 20 of the present invention.

The preferred relatively flexible material 39 and/or the material used in the resilient pad 92 is made of a plastic or rubber material, e.g., natural rubber, neoprene rubber, nitrile rubber, styrene butadiene rubber, silicone, other natural and synthetic rubbers, and polyurethane. Fillers such as organic or inorganic microspheres, carbon black, and other conventional fillers can be used therein. Plasticizing agents such as fluids or oils, can be used to modify the physical and mechanical properties of the relatively flexible material 39 and/or material forming resilient pad 92 in a desired manner. A wide variety of plastic or thermoplastic materials can be used. Thermoset or thermoplastic rubber materials can be used. However, thermoplastic materials and thermoplastic rubber materials, and the like, can be easier, faster, and less expensive to produce as such can be readily injection molded or injection/compression molded, as opposed to being compression molded using relatively time and energy consuming vulcanization processes.

The preferred relatively flexible material 39 and/or the material used to make the resilient pad 92 can also be made of a hybrid combination of thermoplastic and rubber materials which can be injection molded. Materials made by Advanced Elastomer Systems of 338 Main Street, Akron, Ohio 44311, e.g., SANTOPRENE®, VYRAM®, GEOLAST®, TREFSIN®, can therefore been used. Resilient materials which can be cured with the use of microwave, visible or ultraviolet light, radio frequency, ultrasonic energy, or other parts of the electromagnetic spectrum can be used. Room temperature cure elastomers, such as two-component molecular mixture and cure, catalytic cure, or moisture or evaporation cure can also be used, e.g., various polyurethane materials made by the Sartomer Company of West Chester, Pa. 19382.

Figure 16:
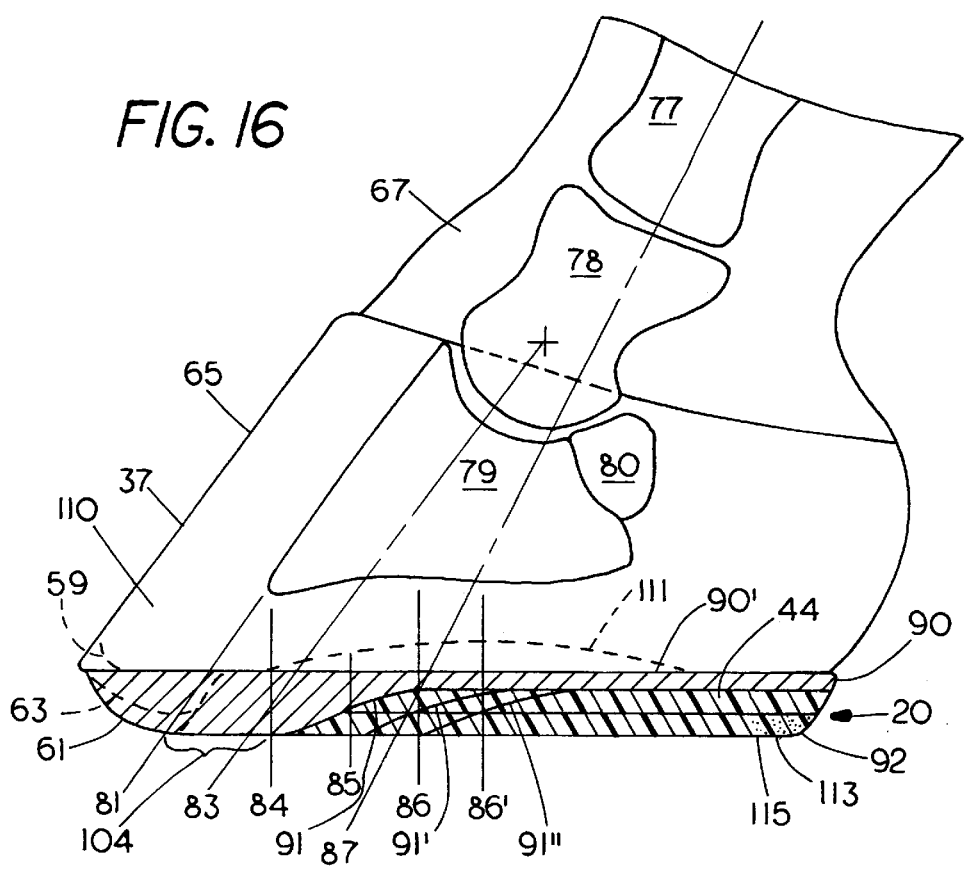
FIG. 16 is a cross-sectional view of a horse's lower leg and foot, showing the use of an alternate horseshoe having a conformance and anterior concavity similar to that shown in FIG. 14, but with the presence of a relatively planar pad in the rear portion of the horseshoe. The alternate use of one of three transition points as between a relatively inflexible material and the resilient material forming the pad is also shown.

The preferred relatively flexible material 39 and resilient pad 92 have a hardness in the range between 75–95, and preferably approximately in the range between 85–90 durometer on the Shore A scale in order to accommodate the loads and wear anticipated during use. It is possible for two different materials to be used when making the relatively flexible material 39 versus the resilient pad 92, e.g., the flexible material could have a hardness in the range between 25–95 durometer on the Shore A scale, and preferably approximately in the range between 50–85 durometer Shore A. It can be advantageous that the relatively flexible material 39 consist of a relatively soft and flexible material. Moreover, a dual density resilient pad 92 consisting of two or more resilient materials having different hardness and stiffness in compression can be used, e.g., in an overlapping relationship, as shown in FIG. 16.

Natural or synthetic rubber materials, plastics, or combinations thereof can be effectively bonded to metal and plastic materials by various means, such as by mechanical bonding, chemical bonding, and/or the use of adhesives. It can sometimes be advantageous to clean or prime the metal material that is to be bonded using conventional materials and techniques. In this regard, reference is made to a book written by Souheng Wu, entitled *Polymer Interface and Adhesion*, published by Marcel Dekker: New York, 1982. Further, numerous primer and adhesive systems are made, e.g., by the Lord Corporation, Industrial Adhesives Division, Erie, Pa. 16514. Bonding of plastic to rubber materials is also possible using various techniques, e.g., see WO 94/13164 or U.S. Pat. No. 5,709,954 to Lyden et al. entitled "Chemical Bonding of Rubber to Plastic in Articles of Footwear," granted Jan. 1, 1998, and assigned to Nike International Ltd, hereby incorporated by reference herein.

For reference to the present inventor's other teachings with regard to functional footwear intended for humans, see U.S. Pat. No. 5,384,973 entitled "Sole with Articulating Forefoot," granted Jan. 31, 1995, U.S. Pat. No. 5,424,184 entitled "Athletic Shoe with Rearfoot Strike Zone," granted Jun. 20, 1995, U.S. Pat. No. 5,595,004 entitled "Shoe Sole Including a Peripherally Disposed Cushioning Bladder," granted Jan. 1, 1997, and U.S. Pat. No. 5,625,964 entitled "Athletic Shoe with Rearfoot Strike Zone," granted Jun. 20, 1995, all of these patents being assigned to Nike International Ltd. See also U.S. Pat. No. 4,674,206 entitled "Midsole Construction/Shoe Insert," U.S. Pat. No. 5,101,580 entitled "Personalized Footbed, Last, and Ankle Support," U.S. Pat. No. 5,203,793 entitled "Conformable Cushioning and Stability Device for Articles of Footwear," and U.S. Pat. No. 5,632,057 entitled "Method of Making Light Cure Component For Articles of Footwear" granted to and owned by the present inventor which relate, e.g., to providing custom fit footwear components such as insoles.

FIG. 1 is a top plan view of a generally U-shaped preferred embodiment of a horseshoe 20 of the present invention showing two articulation points 45 which substantially consist of a relatively flexible material 39. The relatively flexible material 39 is bonded to a plurality of segments 106 which are made of a relatively inflexible material 108. Also shown is the optional use of a wear resistant insert 43 in the anterior area of the horseshoe 20, fullering grooves 21 top side 34 or portion which bears upon the ground support surface, bottom side 36 or portion which bears against the hoof 37, inner side or inside 40, outer side or outside 38, anterior side 41, posterior side 42, phantom line showing position of toe grab 112, and openings 60 for nails (not shown). The general shape and width of the horseshoe 20 can be readily adapted by moving the segments 106 which form opposing legs 52 closer or further apart, as opposing legs 52 can flex about articulation points 45.

FIG. 2 is a top perspective view of a horseshoe 20, an alternate preferred embodiment of the present invention, showing one anterior articulation point 45 including a relatively flexible material 39 which substantially interrupts segments 106 made of a relatively inflexible material 108. Also shown is the use of a wear resistant material 43 in the anterior area of the horseshoe 20, the superior to inferior or z axis 22, anterior to posterior or x axis 24, and medial to lateral, y or transverse axis 26, and the sagittal plane 30, frontal plane 28, and transverse plane 32.

FIG. 3 is a top view of a portion of the preferred horseshoe shown in FIG. 1 with parts broken away near the cross-section taken at approximately one half of the height and in the transverse plane 32 along line 3—3, showing the use of a rivet 25 to join first arm 31 and second arm 33 on segments 106 of the horseshoe 20 which are made of relatively inflexible material 108. The rivet 25 can be flattened on one end in order to prevent the segments 106 from separating. The relatively flexible material 39 is shown as encapsulating articulation point 45. The mechanical means used to join segments 106 will substantially prevent elongation and lengthening therebetween.

Figure 4:
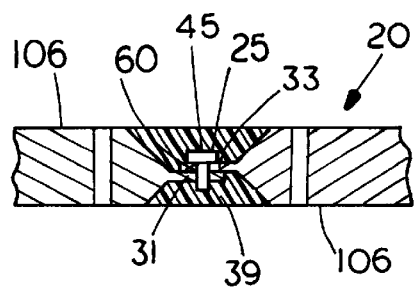
FIG. 4 is a cross-sectional view taken along the superior to inferior axis and substantially in the sagittal plane of the horseshoe shown in FIG. 3 along line 4—4, showing the use of a rivet to joint two arms present on segments of the horseshoe.

FIG. 4 is a cross-sectional view taken along the superior to inferior axis 22 and substantially in the sagittal plane 30 of the horseshoe 20 shown in FIG. 3, along line 4—4, showing the use of a rivet 25 to join first arm 31 and second arm 33 present on segments 106 of the horseshoe 20. The relatively flexible material 39 can substantially encapsulate the articulation point 45.

Figure 5:
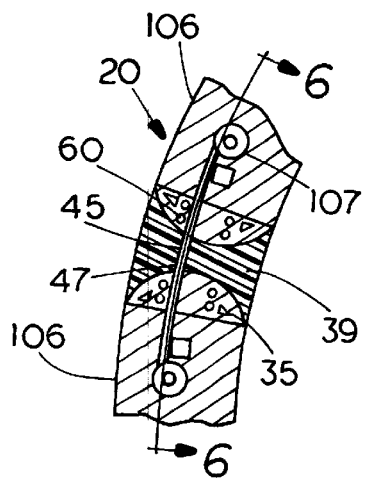
FIG. 5 is a top plan view of an alternate preferred embodiment of a horseshoe similar to that shown in FIG. 1 with parts broken away near the cross-section taken along line 3—3, showing the use of a wire to joint two segments of the horseshoe.

FIG. 5 is a top view of a portion of an alternate preferred horseshoe similar to that shown in FIG. 1 with parts broken away near the cross-section taken at approximately one half of the height and in the transverse plane 32 along line 3—3, showing the use of a wire 47 to join two segments 106 of the horseshoe 20 which are made of relatively inflexible material 108. The wire can optionally include a lug 107 at both ends for enhancing the mechanical bond with the encapsulating relatively inflexible material 108, and/or for engagement with wear resistant insert 43, as shown in FIGS. 9 and 10. Protrusions 35 and/or openings 60 with respect to segments 106 can enhance the mechanical bond between the relatively inflexible material 108 and relatively flexible material 39.

Figure 6:
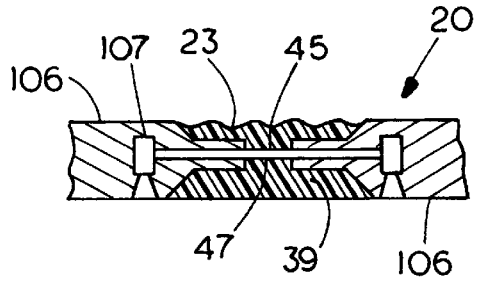
FIG. 6 is a cross-sectional view taken along the superior to inferior axis and substantially in the sagittal plane of the horseshoe shown in FIG. 5 along line 6—6, showing the use of a wire to joint two segments of the horseshoe.

FIG. 6 is a cross-sectional view taken along the superior to inferior axis 22 and substantially in the sagittal plane 30 of the horseshoe 20 shown in FIG. 5 along line 6—6, showing the use of a wire 47 to join two segments 106 of horseshoe 20. Again, lugs 107 can be affixed upon wire 47 to enhance the mechanical bond between the wire 47 and the relatively inflexible material 108 used in making segments 106. The relatively flexible material 39 is shown encapsulating the area about articulation point 45, and a series of recesses 23 are shown thereupon. Recesses 23 can accommodate the possible expansion and contraction of relatively flexible material 39 when the segments 106 are flexed or articulated relative to one another.

Figure 7:
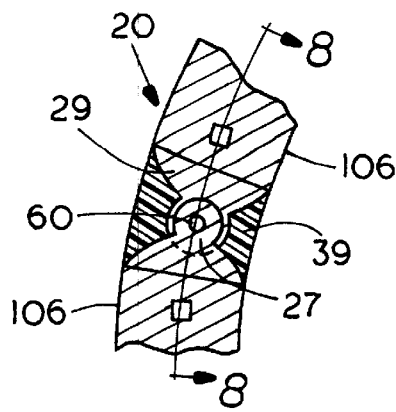
FIG. 7 is a top plan view of an alternate preferred embodiment of a horseshoe similar to that shown in FIG. 1 with parts broken away near the cross-section taken along line 3—3, showing the use of male and female members to joint two segments of the horseshoe.

FIG. 7 is a top view of a portion of an alternate preferred horseshoe similar to that shown in FIG. 1 with parts broken away near the cross-section taken at approximately one half of the height and in the transverse plane 32 along line 3—3, showing the use of a male member 27 and a female member 29 to join two segments 106 of the horseshoe 20. Male member 27 is shown as consisting of a cylindrical shaped extension which passes through an opening 60 in female member 29, although many other configurations are possible.

Figure 8:
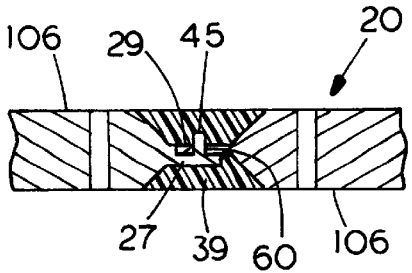
FIG. 8 is a cross-sectional view taken along the superior to inferior axis and substantially in the sagittal plane of the horseshoe shown in FIG. 7 along line 8—8, showing the use of male and female members to joint two segments of the horseshoe.

FIG. 8 is a cross-sectional view taken along the superior to inferior axis 22 and substantially in the sagittal plane 30 of the horseshoe 20 shown in FIG. 7, along line 8—8, showing the use of a male member 27 and female member 29 to connect two segments 106 of the horseshoe 20.

FIG. 9 is a top plan view of the horseshoe 20 shown in FIG. 2 with parts broken away in the anterior area showing the presence of a wire 47, wear resistant inserts 43 made, e.g., of hard metal, and a relatively flexible material 39. Also shown is a top view showing the possible use of a shape and width adjusting device 94 in position upon horseshoe 20. In FIG. 23, shape and adjusting device 94 is shown in detail in a side view. Shape and width adjusting device 94 has two pins 98 which can be inserted to mechanically engage, e.g., the openings 60 formed in the horseshoe 20 in order to accommodate nails (not shown). Pins 98 can be relatively free to rotate about their long axis or can be locked into place by pin locking and adjustment devices 99. Pins 98 and pin locking and adjustment devices 99 are respectively positioned proximate the opposite ends of a first adjustment arm 95 and a second adjustment arm 96. Adjustment arms 95 and 96 are superimposed upon one another and held into relative position by adjustment arm retainer 100, and both adjustment arms 95 and 96 have at least one opening 60 which permits the passage of bolt 109 therethrough. Locking device 97 can apply force to adjustment arms 95 and 96 by clockwise or counterclockwise rotation upon threaded bolt 109 and effectively lock them into a desired position. A blacksmith can then take one of the horse's old horseshoes, or upon inspection of a horse's hoof, use the shape and width adjusting device 94 to either increase or narrow the distance between opposite legs 52 of a horseshoe 20 and so change the shape and width of the horseshoe 20 as desired. The blacksmith can then suitably place the horseshoe 20 including the shape and adjusting device 94 into functional relation to the horse's hoof and affix the horseshoe 20 with nails. The shape and adjusting device 94 can then be removed and the last nails applied. In this way, the blacksmith does not have to apply force to the horseshoe 20 in an attempt to obtain a desired configuration while simultaneously steadying the horse and handling both nails and hammer. Obviously, shape and adjusting device 94 could include more than two adjustment arms for engaging more than two openings 60 on horseshoe 20, as could be desired with a horseshoe having more than three segments 106. Further, various other designs are possible which could essentially function in the same way to achieve the same results.

FIG. 10 is a cross-sectional view taken along the superior to inferior axis 22 substantially along the frontal plane 28 of the horseshoe 20 shown in FIG. 9, along line 10—10. Shown is wire 47 having lugs 107 which can be located or mechanically engaged in relation to wear resistant insert 43. Lugs 107 could have an opening 60 for placing upon a pin or otherwise be positively located relative to wear resistant material inserts 43 with respect to a die or mold when the horseshoe 20 is forged or otherwise manufactured, thus ensuring that these components will be encapsulated while being maintained in the desired relationship and configuration.

FIG. 11 is a cross-sectional view along the superior to inferior 22 axis substantially along the sagittal plane 30 of the horseshoe 20 shown in FIG. 9, along line 11—11. Shown is a tapered toe 49, and an inner side 40 formed in an angle of approximately 52 degrees, i.e., consistent with the angle of the anterior wall of the hoof. Also show is a wire 47 surrounded by encapsulating relatively flexible material 39 about articulation point 45.

Figure 12:
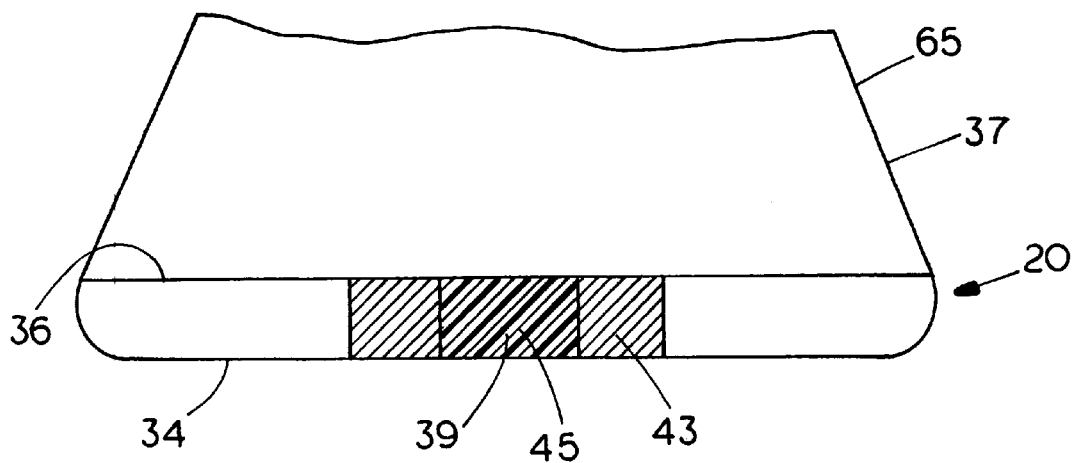
FIG. 12 is a front view of a horseshoe similar to that shown in FIG. 2 having a uniform elevation mounted on a horse's hoof.

FIG. 12 is a front view of a horseshoe 20 similar to that shown in FIG. 2 having a uniform elevation mounted on a horse's hoof 37. Shown are relatively flexible material 39 and wear resistant inserts 43.

Figure 13:
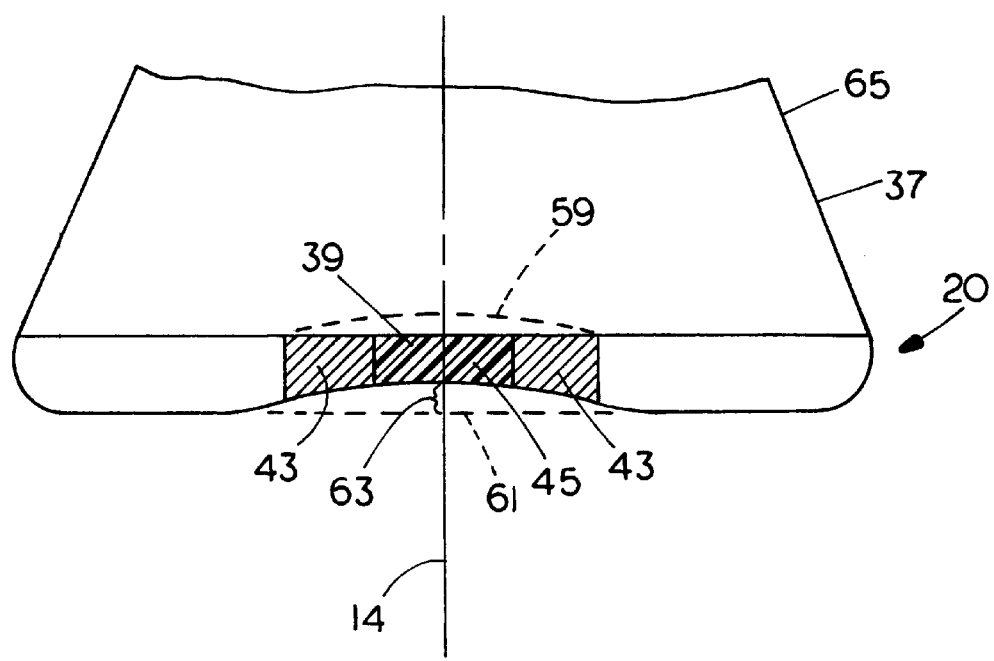
FIG. 13 is a front view of a horseshoe similar to that shown in FIG. 2 mounted on a horse's hoof, showing the normal configuration of a horse's foot when unshod in the natural environment with a dashed line, and like reduced elevation proximate the midline of the horseshoe forming an anterior concavity.

FIG. 13 is a front view of an alternate and preferred horseshoe 20 similar to that shown in FIG. 2 mounted on a horse's hoof 37 showing the normal configuration of an active horse's hoof 37 when unshod and living in a natural environment with dashed line 59, and the elevation of a conventional prior art horseshoe 20 with dashed line 61. Also shown is reduced elevation in the area of the toe proximate the midline of the foot 65, which generally coincides with line 14—14, in the form of an anterior concavity 63 in horseshoe 20. The foot 65 and horseshoe 20 combination thereby assumes a conformance similar to that of a healthy, active and unshod horse when living in a natural environment. With a conventional horseshoe having a total elevation generally in the range of about 0.20–0.37 inches, the preferred maximum amount of reduced elevation in the area of the toe proximate anterior concavity 63, is approximately ⅛ths or 0.125 inches, although other dimensions are possible.

Figure 14:
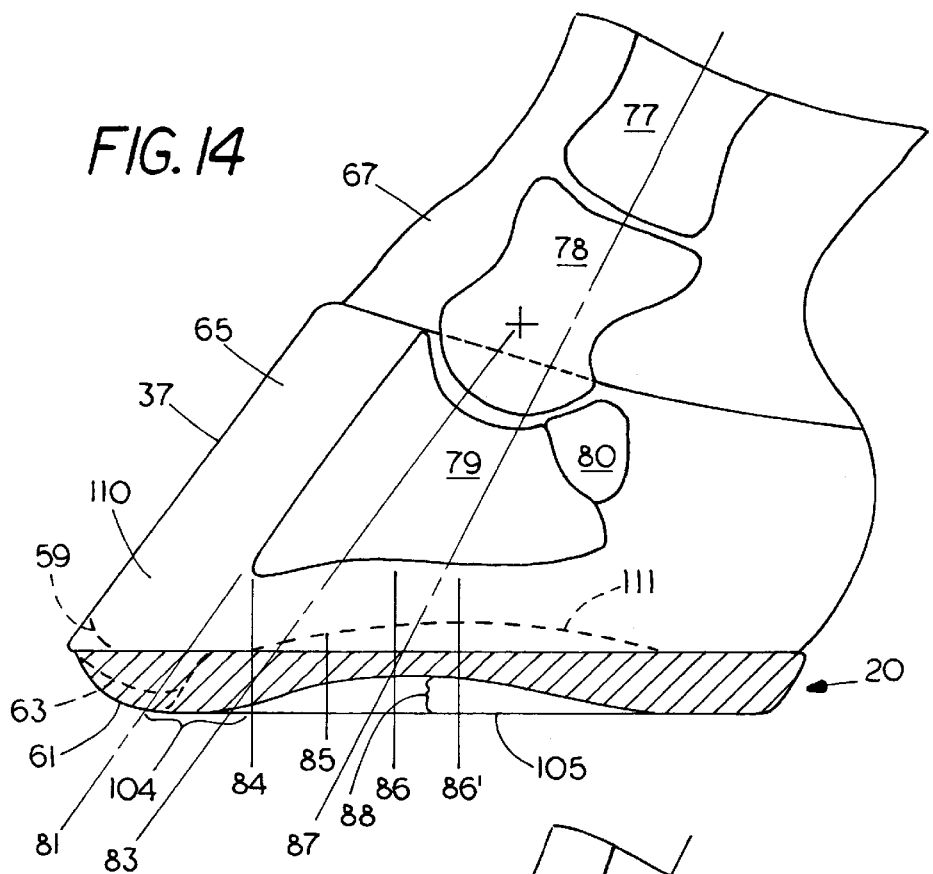
FIG. 14 is a cross-sectional view of a horse's lower leg and foot including a horseshoe similar to that shown in FIG. 13 and also showing the normal configuration of a horse's foot unshod in the natural environment with a dashed lines, and showing like reduced elevation along the side of the horseshoe forming a side concavity. Also shown are the bones of the horse's lower leg and foot, and the approximate relationship of these relative to the position of the frog, the approximate geometric center of the foot, and the approximate position of the rocker area near the toe of the foot.

FIG. 14 is a cross-sectional view of a horse's lower leg 67 and foot 65 including a horseshoe 20 similar to that shown in FIG. 13 and also showing the normal configuration of the toe 110 of an active unshod horse's hoof 37 living in a natural environment with dashed line 59, and about the sides of the hoof 37 with dashed line 111. Also shown are the bones of the horse's lower leg 67 and foot 65, including the coffin bone or P1, the short pastern bone or P2, the long pastern bone or P3, and the navicular bone 80. Line 81 extends along the anterior portion of the coffin bone or P1 and is parallel to the angle of inclination of the anterior portion of hoof 37, thus establishing by its intersection point with the ground engaging surface of horseshoe 20 the anteriormost location with respect to the normal rocker area 104 of the toe 110 of the foot 65. Line 83 extends from the axis of rotation of the short pastern bone or P2 relative to the coffin bone Pi and parallel to line 81, thus establishing in its intersection point with the ground engaging surface of horseshoe 20 the posteriormost location with respect to the rocker area 104 of the toe 110 of the foot 65. An advantageous position of a toe grab, if and when included upon a horseshoe 20 is approximately at or between the location of the intersection points of lines 81 and 83 with the ground engaging surface of horseshoe 20. Likewise, it can sometimes be advantageous to include a wear resistant insert 43 in the rocker area 104 of the toe 110 of the foot 65, as optionally shown in phantom in FIG. 17.

As shown in FIG. 14, line 87 extends from the approximate longitudinal axis of the long pastern bone or P3 and intersects of the horseshoe 20 at approximately the geometric center 86 of the foot 65. Also shown in FIG. 14 is the approximate relationship of the above discussed anatomy and lines relative to the position of the tip of the frog indicated by line 85, the position of which is normally approximately located at about one third the anterior-posterior length of the foot when measured from the front of the hoof 37. The tip of the frog indicated by line 85 is also normally located approximately 0.25–0.75 inches posterior of the anteriormost portion of the coffin bone or P1 indicated by line 84. In FIG. 14, the tip of the frog indicated by line 85 is represented as being 0.50 inches posterior of line 84. The approximate geometric center of the foot indicated by line 86, is in turn normally located about 0.25–0.75 inches posterior of the tip of the frog indicated by line 85.

In FIG. 14, the geometric center of the foot 86 is represented as 0.50 inches posterior of the tip of the frog indicated by line 85. The possible approximate anterior to posterior range in location of the geometric center of the foot given the probable range of anatomic variation would then generally fall between the positions indicated by lines 86 and 86'.

Shown in FIG. 14, is a tapered toe 49 configuration. Shown via a phantom dashed line is the preferred reduced elevation in the area of the toe 110 of horseshoe 20 along the midline of the foot, i.e., the anterior concavity 63, as shown in FIG. 13. Also shown is the elevation of a conventional prior art horseshoe along the sides of the foot 65, indicated by the relatively straight and horizontal line 105, and the preferred reduced elevation and curved configuration of a horseshoe 20 of the present invention along the sides of the foot 65 indicated by a curved line, i.e., side concavity 88. The preferred embodiment of horseshoe 20 according to the present invention then approximates the configuration often found in healthy and active unshod horses living in a natural environment. It is advantageous to accomplish this configuration without having to shape the hoof 37 of the horse's foot 65 in like complex curves, and to then attempt to fit a horseshoe of complex curved shape to such a sculptured hoof, as such would be associated with considerable time, expense, and fatigue to a blacksmith.

Figure 15:
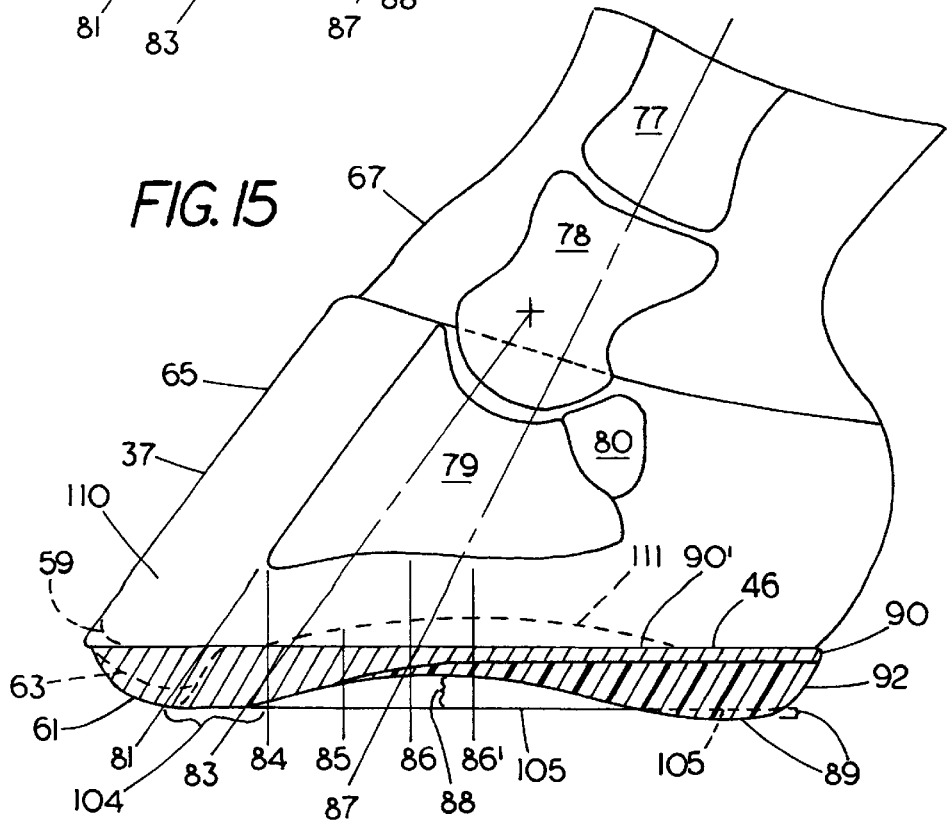
FIG. 15 is a cross-sectional view of a horse's lower leg and foot, showing the use of an alternate horseshoe similar to that shown in FIG. 14, but with the presence of a pad in the rear portion of the horseshoe.

FIG. 15 is a cross-sectional view of a horse's lower leg 67 and foot 65, showing the use of a preferred horseshoe 20 similar to that shown in FIG. 14, but with the presence of a resilient pad 92 in the rear portion 46 of the horseshoe 20. The resilient pad 92 can be formed in a conventional planar shape coincident with line 105, and such can be advantageous for use, e.g., with Standardbreds and/or relatively hard track conditions. Alternately, the resilient pad 92 is preferably formed in a shape including side concavity 88, and such can be advantageous for use, e.g., with Thoroughbreds and/or relatively soft track conditions. Regardless, the elevation of resilient pad 92 can be coincident with line 105 in the posteriormost area of the horseshoe 20. However, it is preferred that the resilient pad 92 elevate the profile of the rear portion 46 of the horseshoe 20 somewhat, as indicated at elevation 89, in order to compensate for the amount of deflection that is expected to occur due to weight bearing when a horse stands or walks slowly upon a horseshoe 20 so that the horse's foot 65 will be substantially maintained in a normal geometric position. Given a resilient pad 92 or horseshoe 20 having a total height in the range of approximately 0.20–0.375 inches including a resilient pad 92 which is engineered to effectively manage the magnitude of the loads experienced when a horse runs somewhere between 30–40 miles per hour, the required and preferred amount of elevation 89 is normally about 1/16th of an inch or 0.0625 inches, and preferably less than 1/8th of an inch or 0.125 inches, although other elevations are possible. Relatively little increase in the elevation 89 of the rear portion 46 of a horseshoe 20 is generally preferred as large deviations can result in biomechanical complications.

A horse weighing 1200 pounds running between 30–40 miles per hour can generate a load in excess of 16,800 pounds upon a single leg. A horseshoe 20 having approximately 6.5 square inches of surface area will then experience about 2585 pounds per square inch. If the total height of resilient pad is about 3/8ths or 0.375 inches and the resilient pad is engineered to deflect to just over one half of its height, that is, so as to avoid bottoming out or otherwise rapidly increasing in stiffness, then about 0.20 inches of deflection will be available for useful work. If the resilient pad is engineered to exhibit 0.20 inches of deflection when loaded to 2600 psi and the resilient pad exhibits a relatively linear stiffness or spring rate (the caveat being that no natural or man-made material exhibits an absolutely linear spring rate), then one could expect, e.g., about 0.10 inches of deflection at 1300 psi, and 0.05 inches of deflection at 650 psi. Accordingly, the provision of about 1/16th or 0.0621 inches of elevation 89 in the rear portion 46 of horseshoe 20 will normally be sufficient to compensate for the deflection of resilient pad 92 when loaded by a horse that is standing or walking slowly. In addition, in order to optimize the performance characteristics of a preferred horseshoe 20, the stiffness in compression of the material used in resilient pad 92 can be varied given the projected weight, running technique, running velocity or pace, and expected track conditions.

Also shown in FIG. 15 is the posterior terminal point 90 of the relatively inflexible material 108 used in making horseshoe 20. Shown are alternate terminal points 90' spaced approximately 0.25 inches apart, as it is possible for the relatively inflexible material 108 used in horseshoe 20, e.g., aluminum, to be replaced by the material of the resilient pad 92 in this area provided that the stiffness of the material be properly engineered, as discussed above. This alternate preferred embodiment of horseshoe 20 can provide for the introduction of about an additional 1/8ths or 0.125 inches of cushioning medium in this location.

It can be advantageous to provide at least 1/8th inch of elevation with respect to the relatively inflexible material 108 used in making a preferred horseshoe in the area about the fullering grooves 21 and openings 60 for accommodating nails in order to ensure that the nails be properly seated, and retained.

FIG. 16 is a cross-sectional view of a horse's lower leg 67 and foot 65, showing the use of an alternate horseshoe 20 that can, if desired, include an anterior concavity 63 similar to that shown in FIG. 14 and a relatively planar resilient pad 92 in the rear portion of the horseshoe 20. The alternate use of one of three transition points 91 as between the relatively inflexible material 108, such as aluminum, and the resilient material of pad 92 is also shown. These three alternate configurations and transition points 91 can influence the location and size of the rocker area 104 of the toe 110 of the foot 65. Different configurations can be advantageous for use with different horses and track conditions. The use of a generally planar resilient pad is normally more desirable for use with Standardbreds than Thoroughbreds, as the former frequently train and race on relatively firm tracks, whereas the latter frequently train and race on relatively soft tracks. Also shown is the optional use of a dual density resilient pad 92. A resilient material exhibiting lesser hardness and stiffness in compression 114 is shown in a superior position relative a resilient material exhibiting greater hardness and stiffness in compression 115 shown in an inferior position. The latter material will be placed in contact with the ground support surface or track and can provide better wear and abrasion resistance, thus an extended service life. Further, it can be advantageous to fortify the ground engaging portion of a resilient pad 92 by the inclusion of filler material 113, such as a metal or ceramic material, as shown in FIGS. 16 and 18.

Figure 17:
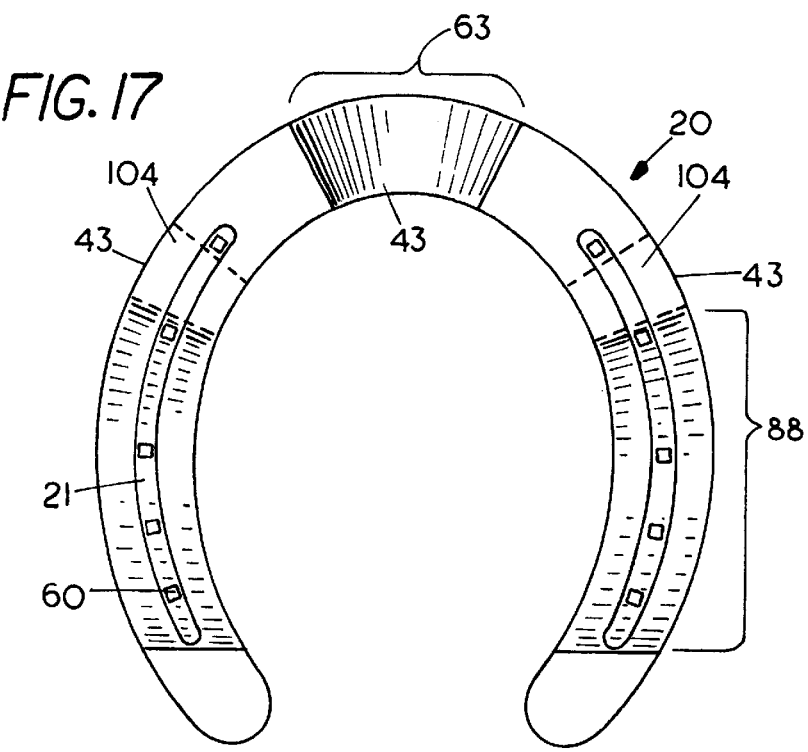
FIG. 17 is a top plan view of a horseshoe having an anterior concavity and side concavities similar to the configurations shown in FIGS. 13 and 14.

FIG. 17 is a top plan view of an alternate preferred horseshoe 20 having anterior concavity 63 and side concavity(s) 88 and the general configurations shown in FIGS. 13 and 14. Also shown is optional wear resistant insert 43 located proximate anterior concavity 63, and in phantom, the optional use of wear resistant inserts 43 proximate the rocker area(s) 104 of the toe 110 of the foot 65.

Figure 18:
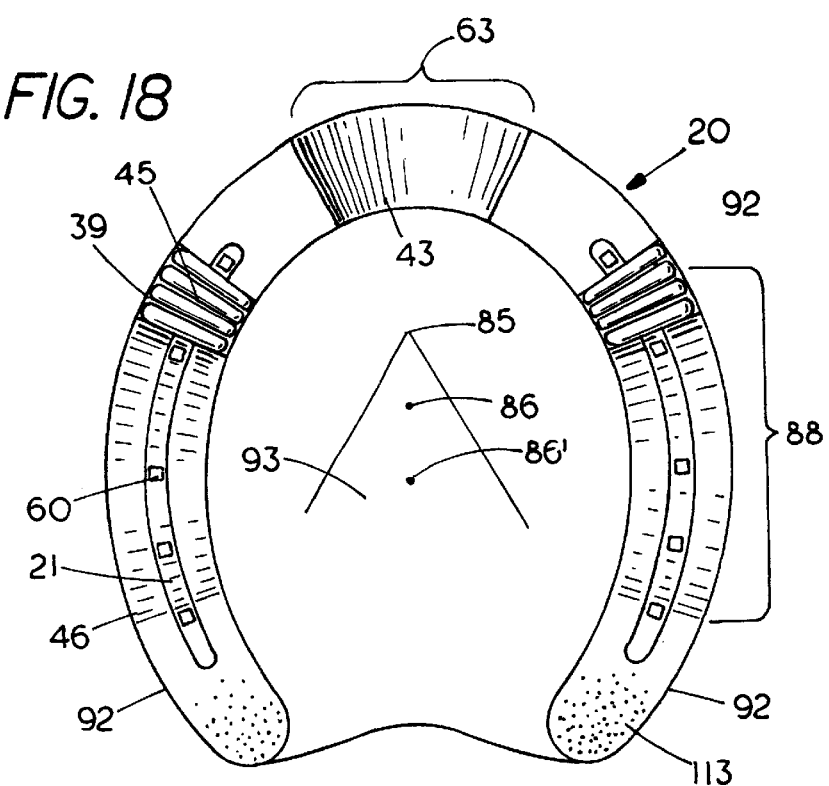
FIG. 18 is a top plan view of a horseshoe having an anterior concavity and side concavities similar to the configurations shown in FIGS. 13 and 15. This horseshoe also includes a resilient pad in the rear portion, but also two flex points similar to hose shown in FIGS. 1 and 5.

FIG. 18 is a top plan view of an alternate preferred horseshoe 20 having anterior concavity 63 and side concavity(s) 88 and the general configuration shown in FIGS. 13 and 15. This horseshoe 20 includes a resilient pad 92 in the rear portion 46, and also two articulation points 45 similar to those shown in FIG. 5. Articulation points 45 can be positioned proximate the rocker area 104 of the toe 110 of the foot 65, as shown, or anteriorly or posteriorly of the same. When articulation points 45 and flexible material 39 are positioned approximately at the rocker area(s) 104 of the toe 110 of the foot 65, it can be advantageous to use a flexible material 39 having enhanced wear resistance, thus a filler material 113 can be included in the flexible material 39 for this purpose.

It can be readily understood that the presence of flexible material 39 proximate the rocker area 104 of the toe 110 of the foot 65 can provide de facto a resilient pad and cushioning in this area. This configuration could be preferred for use with horses coming off of an injury, or with Standardbred horses which commonly train and race on relatively hard tracks, or with horses which are routinely exposed to hard surfaces. However, it is sometimes advantageous that flexible material 39 not be used proximate the rocker area 104 of the toe 110 of the foot 65 when it is desired to maximize running efficiency and speed. It can be readily understood that a horseshoe 20 having a single articulation point 45, as shown in FIG. 2, or no articulation points 45 as shown in FIG. 17, or articulation points 45 which do not coincide with the rocker area 104 of the toe 110, can lend itself for use in this case. Also shown in FIG. 18 is the frog 93, the approximate location of the tip of the frog 85, and the geometric center 86 of the foot 65.

Figure 19:
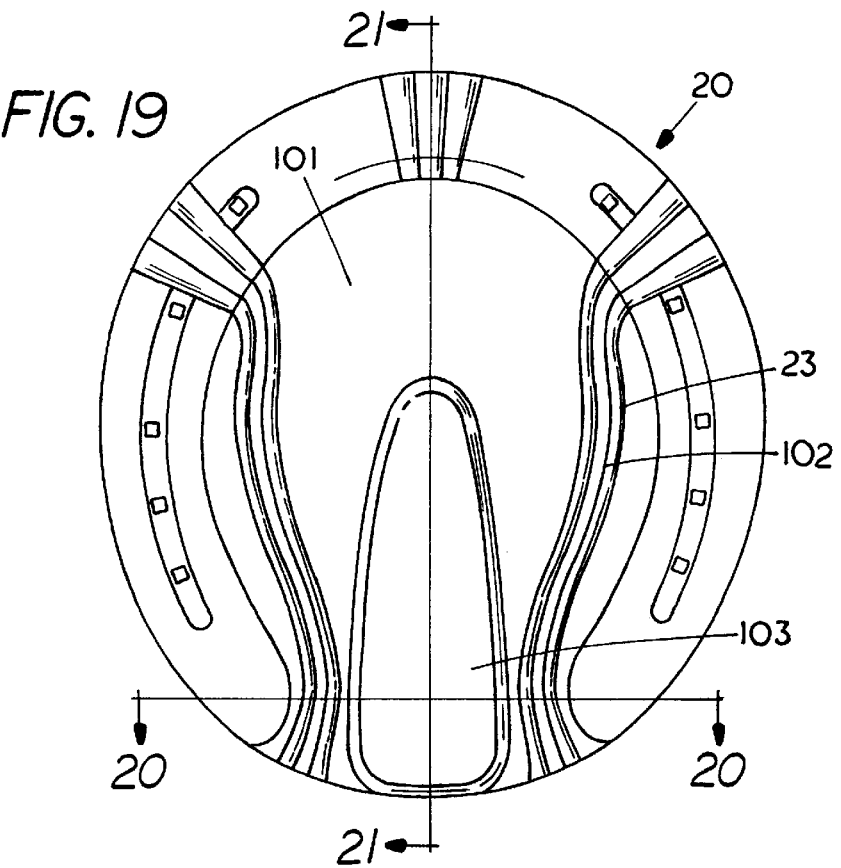
FIG. 19 is a top plan view of a horseshoe forming a full pad covering the bottom of a horse's foot including two articulation points similar to those shown in FIG. 1, and also including a lift for the frog.

FIG. 19 is a top plan view of an alternate horseshoe 20 forming a full pad 101 covering the bottom of a horse's foot 65 including two articulation points 45 similar to those shown in FIG. 1, but also including a lift 103 for the frog 93. Shown are recesses 23 associated with pleats 102 which facilitate manipulation of the horseshoe 20 during shoeing, but also the natural widening and narrowing of the rear portion 46 of the hoof 37 as it flexes when loading takes place.

FIG. 20 is a cross-sectional view along the frontal plane 28 of the horseshoe 20 shown in FIG. 19, along line 20—20. Shown are recesses 23, pleats 102, and several phantom lines showing possible elevations with respect to the lift 103 for the frog 93. Often, the more serious the injured condition of the horse the greater will be the desired amount of elevation, but even this cannot be said with absolute certainty due to the many possible kinds of equine injuries and varied circumstances.

FIG. 21 is a cross-sectional view along the sagittal plane 30 of the horseshoe 20 shown in FIG. 19, showing a lift 103 for the frog 93.

FIG. 22 is a top plan view of a horseshoe 20 similar to that shown in FIG. 19, but having openings 60 therein. In some cases, it can be advisable to fully enclose the bottom of a horse's foot in order to keep out foreign matter, e.g., if the foot is being medicated. In other circumstances, it can be desirable for the foot to be exposed to air and dry out. Further, the provision of an opening in the anterior portion of the pad can sometimes enable a horse to get a better grab on the ground support surface. Openings 60 along the sides of the frog 93 can then facilitate expelling foreign matter, e.g., as the foot slides forward upon initial impact with the ground support surface.

FIG. 23 is a side view of the shape and width adjustment device 94 for a horseshoe 20 shown in FIG. 9, and has been previously discussed above.

While the detailed description of the invention contains many specificities, these should not be construed as limitations on the scope of the invention, but rather as exemplifications of several preferred embodiments thereof. Many other variations are possible. If desired, the teachings of the present invention can be combined, and many possible combinations and permutations are possible. Accordingly, the scope of the invention should be determined not by the embodiments discussed or illustrated, but by the appended claims and their legal equivalents.

What is claimed is:

1. A horseshoe comprising an inner side, outer side, top side and bottom side, said bottom side substantially oriented upon a single transverse plane, said horseshoe comprising an anterior concavity and a plurality of segments, said segments substantially comprising a relatively inflexible material, said segments being capable of articulation relative to one another along said transverse plane about at least one articulation point, said at least one articulation point located anterior of a transverse axis, said at least one articulation point substantially encapsulated by a relatively flexible material, wherein the top side, bottom side, inner side and outer side of said plurality of segments located anterior of said transverse axis substantially comprise said relatively inflexible material.

2. The horseshoe according to claim 1, comprising two segments and an anterior side, said two segments being capable of articulation relative to one another along said transverse plane about an articulation point proximate said anterior side.

3. The horseshoe according to claim 1, comprising a first segment, a second segment, and a third segment, said segments being capable of articulation relative to one another along said transverse plane about a first articulation point and a second articulation point, said first articulation point being between said first segment and said second segment, and said second articulation point being between said first segment and said third segment.

4. The horseshoe according to claim 1, comprising mechanical means for joining said segments and substantially preventing elongation therebetween.

5. The horseshoe according to claim 4, wherein said mechanical means comprises a wire extending substantially transversely.

6. The horseshoe according to claim 4, comprising a first segment having a first arm and a second segment having a second arm, said first and second arms each having an opening, and a rivet passing through said openings joining said segments.

7. The horseshoe according to claim 4, comprising a first segment having a male member, and a second segment having a female member, said male member and said female members joined in functional relation.

8. The horseshoe according to claim 1, wherein said segments comprising relatively inflexible material comprise metal.

9. The horseshoe according to claim 8, wherein said metal substantially comprises aluminum.

10. The horseshoe according to claim 1, wherein said relatively flexible material comprises a thermoplastic material.

11. The horseshoe according to claim 10, wherein said thermoplastic material comprises polyurethane.

12. The horseshoe according to claim 1, comprising a wear resistant insert.

13. The horseshoe according to claim 1, comprising a toe grab.

14. The horseshoe according to claim 1, comprising a tapered toe.

15. The horseshoe according to claim 1, comprising a resilient pad.

16. The horseshoe according to claim 1, comprising a resilient pad substantially covering the frog.

17. The horseshoe according to claim 1 further comprising a side concavity.

18. A horseshoe having a bottom side, said bottom side being substantially orientated upon a single transverse plane, said horseshoe comprising an anterior concavity.

19. A horseshoe having a bottom side, said bottom side being substantially orientated upon a single transverse plane, said horseshoe comprising an anterior concavity and a side concavity.

* * * * *